United States Patent
Jayakrishnasamy et al.

(10) Patent No.: US 12,072,914 B1
(45) Date of Patent: Aug. 27, 2024

(54) METHOD AND SYSTEM FOR CLUSTERING WITH NOISE REDUCTION AND APPLICATIONS THEREOF

(71) Applicant: Verizon Patent and Licensing Inc., Basking Ridge, NJ (US)

(72) Inventors: Miruna Jayakrishnasamy, Vellore (IN); Prakash Ranganathan, Tamilnadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/488,285

(22) Filed: Oct. 17, 2023

(51) Int. Cl.
*G06F 16/28* (2019.01)

(52) U.S. Cl.
CPC .................. *G06F 16/285* (2019.01)

(58) Field of Classification Search
CPC ............... G06F 16/1748; G06F 16/215; G06F 16/2365; G06F 16/285; G06F 16/56; G06F 16/35; G06F 18/10; G06F 18/23; G06F 18/231; G06F 18/23213; G06F 18/24; G06F 17/16; G06F 16/355; G06N 20/00; G06N 3/08; G06N 3/088
See application file for complete search history.

(56) References Cited

U.S. PATENT DOCUMENTS

| | | | | |
|---|---|---|---|---|
| 11,372,893 | B2 * | 6/2022 | Dalek | G06N 5/025 |
| 11,514,321 | B1 * | 11/2022 | Chen | G06N 3/08 |
| 2023/0125150 | A1 * | 4/2023 | Cutler | G06F 18/214 |
| | | | | 706/15 |
| 2023/0162049 | A1 * | 5/2023 | Hall | G16H 40/67 |
| | | | | 706/45 |

OTHER PUBLICATIONS

Salimi-Khorshidi et al., Automatic denoising of functional MRI data: Combining independent component analysis and hierarchical fusion of classifiers, Jan. 2, 2014, NeuroImage, vol. 90, pp. 449-468 (Year: 2014).*

\* cited by examiner

*Primary Examiner* — Robert W Beausoliel, Jr.
*Assistant Examiner* — Cheryl M Shechtman

(57) ABSTRACT

The present teaching is directed to clustering with denoising capability and its use in network capacity planning. Data samples with attributes of network elements and respective key performance indicators are first clustered to obtain initial clusters. Each initial cluster is hierarchically clustered to generate subclusters, each of which is detected as a pure or an impure subcluster based on some criterion. Each impure subcluster is denoised based on a situation detected, with some samples merged with a corresponding pure subcluster, some bootstrapped using additional data samples with consistent properties, and some removed if additional data sample with consistent properties is not available. The denoising is iteratively performed until a denoising criterion is satisfied to obtain denoised clusters corresponding to clusters of network elements. Actions may be performed on the network elements according to their corresponding denoised clusters.

20 Claims, 13 Drawing Sheets

Fig. 4A

| | Late Charge | Prev_Bill | Current_Bill |
|---|---|---|---|
| 0 | 400 | 1300 | 900 |

410 → Late Charge; 420 → Prev_Bill; 430 → Current_Bill; 440 → row

Fig. 4B — Reference Bill Table (450)

| | Late Charge | Prev_Bill | Current_Bill |
|---|---|---|---|
| 0 | 500 | 1500 | 1000 |
| 1 | 400 | 2000 | 1800 |
| 2 | 5 | 1000 | 700 |
| 3 | 420 | 1400 | 1100 |
| 4 | 0 | 200 | 200 |

Fig. 4C

| | Late Charge | Prev_Bill | Current_Bill |
|---|---|---|---|
| 0 | 500 | 1500 | 1000 |
| 1 | 400 | 2000 | 1800 |
| 3 | 420 | 1400 | 1100 |

460

METHOD AND SYSTEM FOR CLUSTERING WITH NOISE REDUCTION AND APPLICATIONS THEREOF

BACKGROUND

Clustering divides data into different clusters in an unsupervised manner. Data samples in the same clusters are considered having similar characteristics. For example, textual content may be clustered so that content on similar topics may be grouped together. Numeric information may also be used to cluster data into different groups, each of which may correspond to a numeric scope. The quality of data collected for clustering impacts the reliability of the clustering result. For instance, presence of noise in the data may yield different challenges, making it difficult to be utilized effectively.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4A illustrates a numeric data sample;

FIG. 4B shows exemplary numeric data samples from which consistent data samples may be identified to bootstrap data for iterative clustering, in accordance with an embodiment of the present teaching;

FIG. 4C shows exemplary bootstrapped data samples for iterative clustering, in accordance with an embodiment of the present teaching;

DETAILED DESCRIPTION OF EXAMPLE EMBODIMENTS

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Figure 1A:
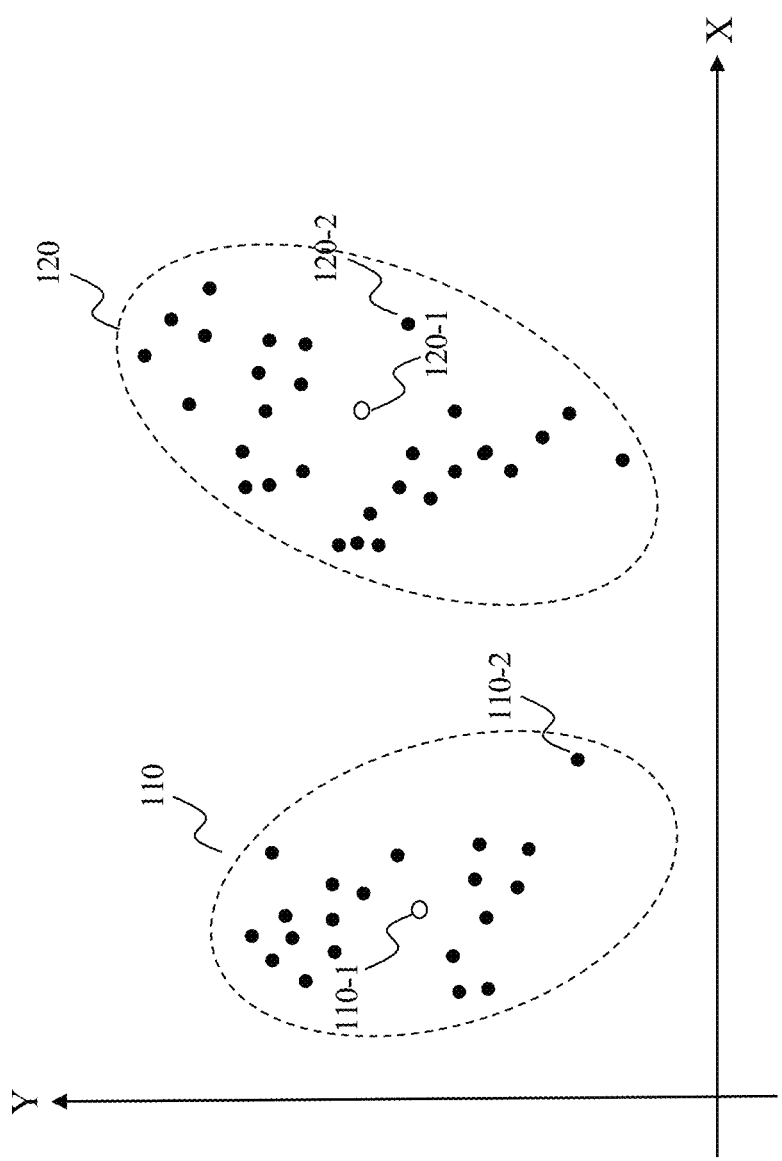
FIG. 1A provides an example clustering result on some exemplary data samples.
Figure 1B:
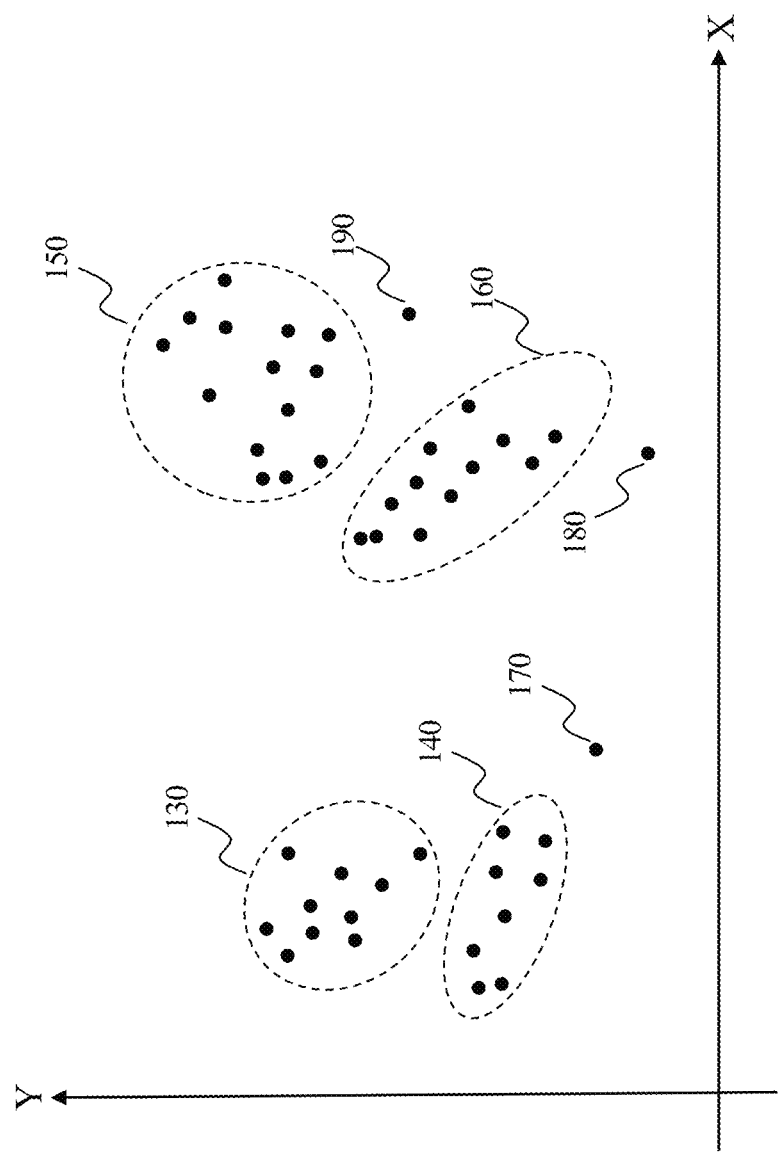
FIG. 1B shows a different example clustering result on the same set of data samples when noisy data points are recognized and processed accordingly.

The present teaching is directed to an automated denoising approach to obtain an improved clustering result with denoised clusters. According to the present teaching, a conventional clustering result may be first evaluated to recognize different noise conditions and reduce noise by addressing each detected condition separately to achieve an optimal result. FIGS. 1A-1B illustrate exemplary noise conditions. As shown in FIG. 1A, data samples projected in a two-dimensional coordinate system X-Y space may be clustered using any conventional clustering process to yield two clusters 110 and 120, where each cluster (e.g., cluster 110) includes data points that are more similar to each other as compared with data points in the other cluster (e.g., cluster 120). Each of the clusters has its centroid, e.g., cluster 110 has its centroid 110-1 and cluster 120 has its centroid 120-1. From this clustering result, it is observed that neither of the cluster is compact, i.e., data points in each cluster may be distant from its centroid according to some threshold. In addition, each cluster has some data point far away from both the cluster centroid and other points (e.g., data point 110-2 in cluster 110 as well as data point 120-2 in cluster 120). Such points may be outliers, or they are from some other underlying clusters.

Such observations may indicate that the clusters 110 and 120 may have noise present. FIG. 1B illustrates exemplary improved clustering result with sub-clusters 130 and 140 further obtained from initial cluster 110 and sub-clusters 150 and 160 further obtained from initial cluster 120. Data point 170 in cluster 110 may now be treated as an outlier. Similarly, data points 180 and 190 are now also treated as outliers in this exemplary result. In some situations, such outliers may correspond to data points from some other underlying clusters. If more data samples become available, these isolated data points may form new clusters with newly collected data samples. The present teaching provides an automated approach to detect different situations associated with a noisy clustering result and accordingly remove, with respect to each of the detected situations, noise using corresponding processing to generate a denoised clustering result.

In some embodiments, a conventional clustering approach may initially be applied to a set of data to obtain an initial set of clusters of that data. To detect whether each of the initial clusters corresponds to a noisy cluster, the initial cluster may be further clustered to produce a set of sub-clusters. Noise detection is carried out to identify sub-clusters that include noise, referred to as impure sub-clusters. Depending on the detected situation, some sub-clusters may be output as denoised clusters, some may be merged, some may be used to collect other consistent data points to bootstrap, and some may be removed. The remaining data points in the processed sub-clusters may then be re-clustered in an iterative process until the hierarchical clustering result satisfies some convergence criteria to produce denoised clusters for each of the initial clusters.

Figure 2A:
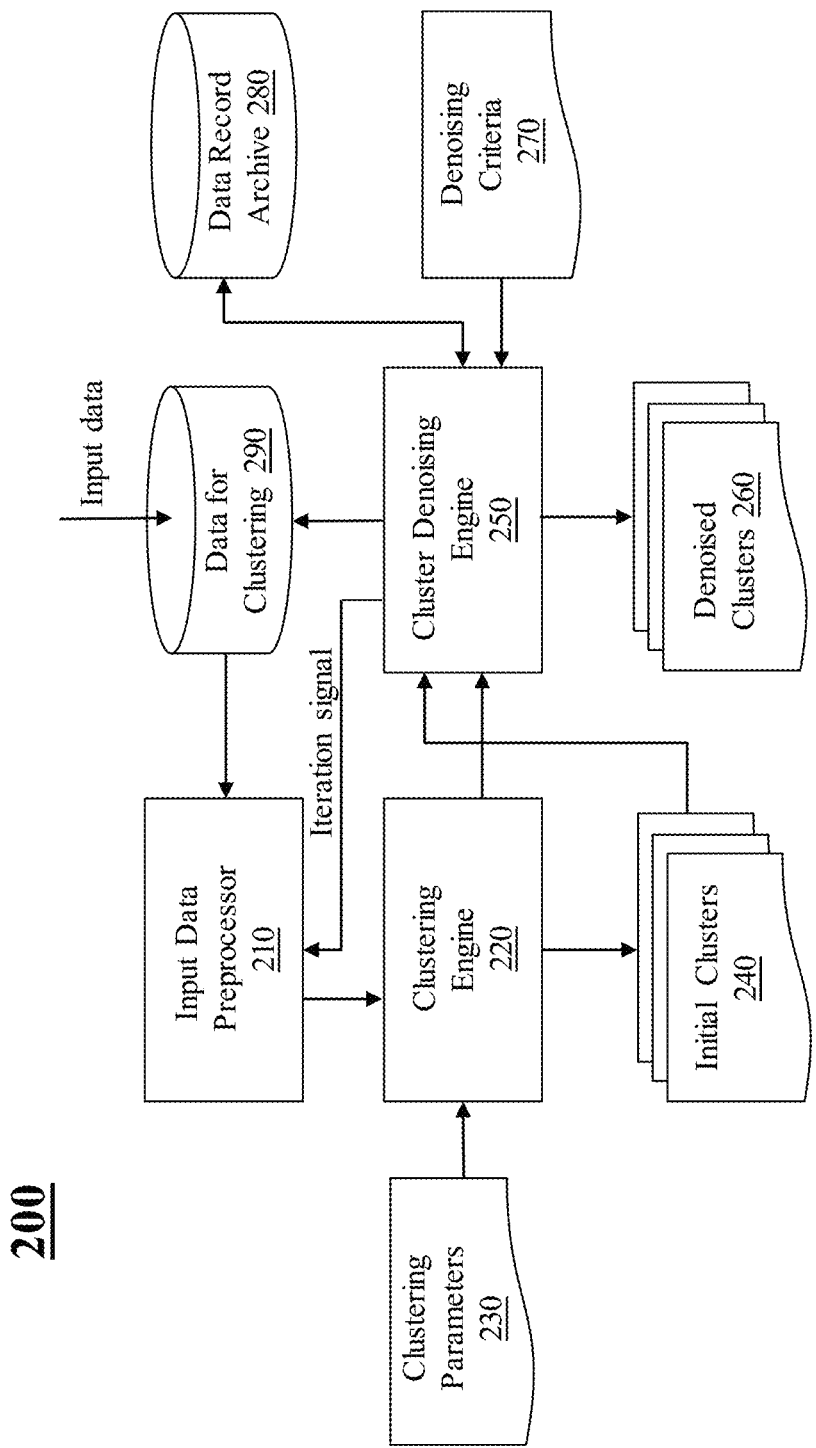
FIG. 2A depicts an exemplary high-level system diagram of a framework for automatically generating denoised clusters, in accordance with an embodiment of the present teaching.
Figure 2B:
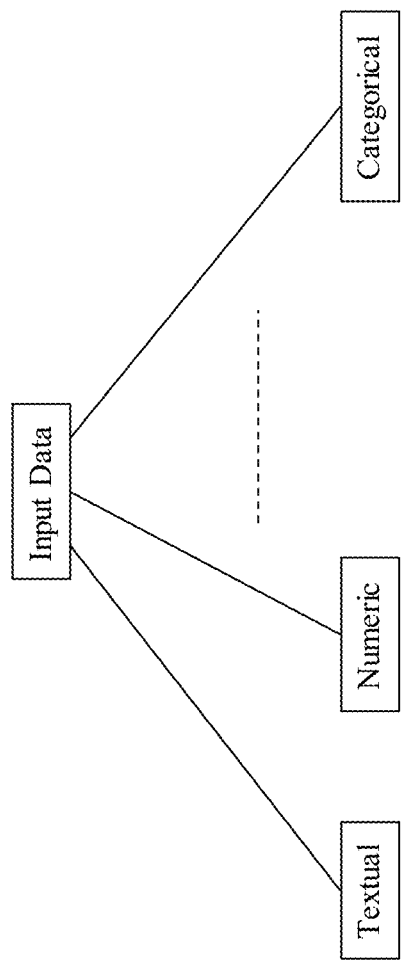
FIG. 2B shows exemplary types of data that may be clustered to generate denoised clusters.

FIG. 2A depicts an exemplary high-level system diagram of a framework 200 for automatically generating denoised clusters, in accordance with an embodiment of the present teaching. In this illustrated embodiment, the framework 200 comprises an input data preprocessor 210 for processing input data samples to be clustered, a clustering engine 220 for performing an initial clustering on data to be clustered, and a clustering denoising engine 250 for generating, based on the initial clustering result, denoised clusters. The data to be clustered may be stored in a database 290 which may include input data including samples to be clustered and additional data samples subsequently identified by the cluster denoising engine 250 from a data record archive 280. Details related to when and how to identify such additional data samples will be provided with reference to FIGS. 3A-6. Data that may be clustered according to the present teaching to produce denoised clusters may include different types. FIG. 2B shows exemplary types of data which may include textual data, numeric data, as well as categorical data.

In some embodiments, data to be clustered may be preprocessed before the initial clustering. For example, preprocessing may include normalization of features in different dimensions, etc. Based on the preprocessed data, the clustering engine 220 may then cluster the data according to configured clustering parameters 230 to generate an initial set of clusters 240, which may then be denoised via the cluster denoising engine 250 with respect to some denoising criteria 270 to produce denoised clusters 260. The denoising criteria 270 may be configured according to the need of different applications.

Figure 2C:
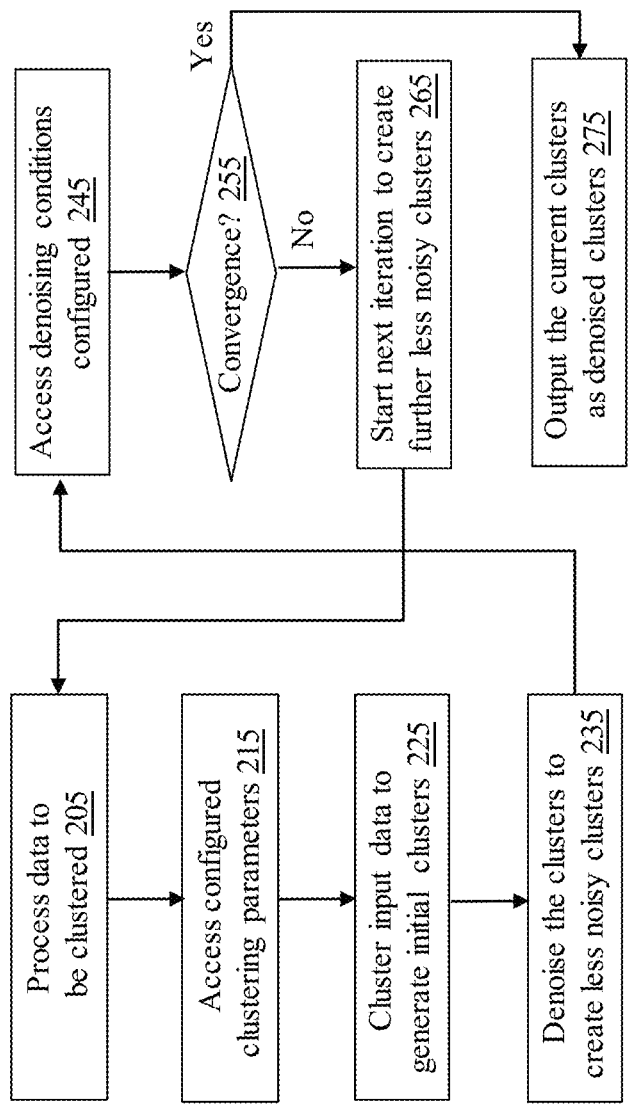
FIG. 2C is a flowchart of an exemplary process of a framework for automatically generating denoised clusters, in accordance with an embodiment of the present teaching.

FIG. 2C is a flowchart of an exemplary process of the framework 200 for automatically generating denoised clusters, in accordance with an embodiment of the present teaching. In operation, data to be clustered may first be processed at 205. To cluster the data, the clustering engine 220 may access, at 215, clustering parameters 230 and cluster the processed data at 225 to generate an initial set of clusters 240, which may be denoised according to the present teaching. In some embodiments, the clustering engine 220 may be implemented using any clustering algorithms, whether currently available or developed in the future, to cluster the data. Examples of existing clustering algorithms include K-means clustering algorithm, mean-shift clustering algorithm, density-based spatial clustering algorithm, expectation-maximization (EM) clustering using Gaussian mixture model (GMM), and agglomerative hierarchical clustering algorithm.

As discussed herein, the denoising operation may be done in an iterative manner and at each iteration the cluster denoising engine 250 may denoise each of the initial clusters, at 235, to create reduced noise clusters. To determine whether the reduced noise clusters generated in each iteration qualify as denoised clusters, the cluster denoising engine 250 accesses, at 245, preconfigured denoising criteria 270 and use that to determine, at 255, whether the denoising operation has converged. Some exemplary denoising criteria are discussed with reference to FIG. 6. If the convergence is detected, the cluster denoising engine 250 outputs, at 275, the current clusters as denoised clusters. If not yet converged, i.e., the denoising criteria are not satisfied, the cluster denoising engine 250 starts, at 265, the next round of denoising by returning to step 205 to repeat the process in order to create further less noisy clusters. The iteration continues until the denoising criteria 270 are satisfied by the generated clusters.

As discussed herein, the clustering engine 220 may be implemented by a conventional clustering method to obtain initial clusters, each of which may then be denoised based on the present teaching. In some embodiments, the clustering parameters 230 may be configured so that the initial clusters generated may be more suitable for the denoising operation. For instance, the clustering parameters may be configured to allow more variations with each initial cluster. Given that, decisions regarding noise type may be left to the denoising operation. FIG. 1A illustrates such an example, where clusters 110 and 120 are derived to encompass more data samples with more variations. Then each of the clusters may be denoised separately via an iterative operation to produce one or more denoised clusters. Details regarding the denoising process according to the present teaching are provided below with reference to FIGS. 3A-6.

Figure 3:
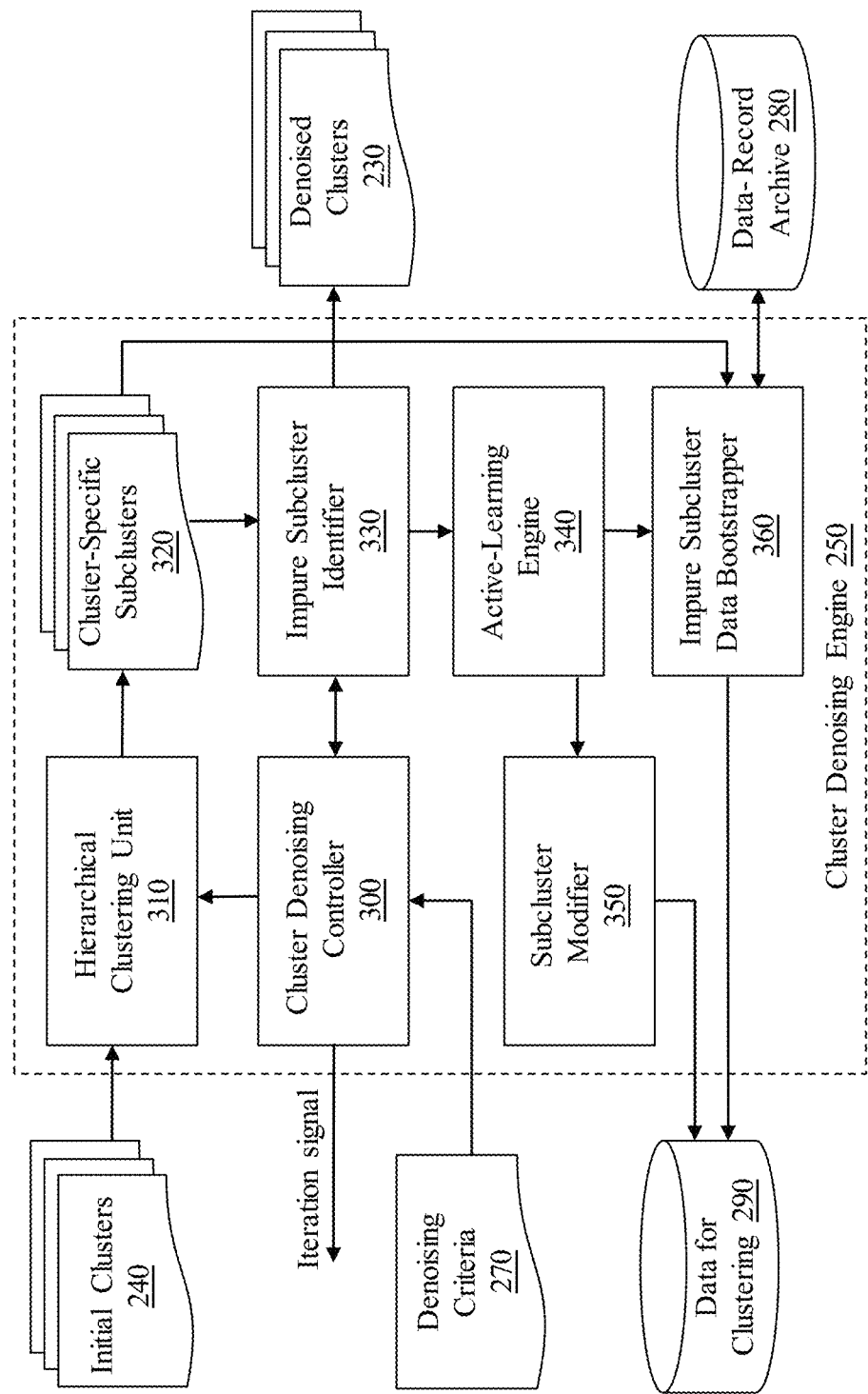
FIG. 3 depicts an exemplary high level system diagram of a cluster denoising engine, in accordance with an embodiment of the present teaching.

FIG. 3 depicts an exemplary high level system diagram of the cluster denoising engine 250, in accordance with an embodiment of the present teaching. In this illustrated embodiment, the cluster denoising engine 250 takes each of the initial clusters 240 as input and produces a set of denoised clusters 230 via a denoising process controlled based on denoising criteria 270. As discussed herein, the denoising of each initial cluster may be performed in an iterative process. During the iteration, the cluster denoising engine 250 may expand the data to be clustered 290 by collecting additional data samples from data record archive 280 that are consistent with some of the questionable data samples in the initial cluster to bootstrap the base of similar data to facilitate more reliable clustering decisions in the next iteration. In the embodiment as shown in FIG. 3A, the cluster denoising engine 250 comprises a cluster denoising controller 300, a hierarchical clustering unit 310, an impure subcluster identifier 330, an active-learning engine 340, a subcluster modifier 350, and an impure subcluster data bootstrapper 360.

The clustering denoising controller 300 may be provided for controlling the process of the denoising operation. The hierarchical clustering unit 310 may be provided for perform, based on each initial cluster, a hierarchical clustering to obtain multiple subclusters 320 for the initial cluster. The subclusters 320 form the basis for the denoising processing and are used by the impure subcluster identifier 330 to determine whether any of the subclusters is impure or a subcluster with noise. If no subcluster is noisy, i.e., no impure subclusters, the subclusters are considered as denoised and output as such. If any of the subclusters is impure, the active-learning engine 340 is invoked to determine whether each of the impure subcluster is to be merged with a specific pure subcluster and if so, the specific pure subcluster is modified by the subcluster modifier 350 to include the data samples from the detected impure subcluster.

If the impure subcluster cannot be merged with a pure subcluster (e.g., it stands alone), the impure subcluster data bootstrapper 360 may be invoked to collect, from the data record archive 280, additional data samples that are consistent or similar to the data sample in the impure subcluster. The purpose to identify, if any, additional data samples consistent with the data in the impure subcluster is to see whether the data in the impure subcluster corresponds to isolated data points or samples from an underlying population (cluster) that happen not yet has adequate representative samples in the data currently being clustered. In the former situation, the data in the impure subcluster may be deemed as noise. In the latter case, the consistent additional data samples identified from the data record archive 280 may support that the data in the impure subcluster is not noise, in which case the additional data samples from the data record archive 280 may be appended to the data set to be clustered 290 as bootstrapped data to facilitate an improved clustering in the next iteration.

According to the present teaching, the hierarchical clustering applied to each of the initial clusters may yield multiple subclusters. The impure subcluster identifier 330 may identify impure subclusters from these subclusters based on some criterion. In some embodiments, the criterion of detecting impure subclusters may be set according to application needs. For example, a criterion used for detecting impure subclusters may be specified based on the size of the subcluster, which may be estimated by the number of data samples in the subcluster. When the number of data samples in a subcluster is small, it is more likely that the subcluster is noisy or the data samples in the subcluster represent noise. Each impure subcluster detected may be further examined and processed according to the present teaching. With respect to each impure subcluster, active learning may be applied to detect if the impure subcluster is similar to a pure subcluster. As a special type of machine learning, active learning as discussed herein may be implemented so that data points may be labeled during learning based on information from a different source, such as a user via interaction. If so, the impure subcluster may be merged with the pure subcluster by merging the data samples in the impure subcluster with the pure subcluster to form a modified pure subcluster.

If the active learning indicates that the impure subcluster is not similar to any pure subclusters, it may further be determined whether the impure subcluster is merely noise or another subcluster without adequate data points to support it. To make that determination, the impure subcluster data bootstrapper 360 may compute representative features of the data samples in the impure subcluster and then use such representative features to search for data records from archive 280 with similar features. If consistent records based on the representative features are found, it may indicate that the impure subcluster does not correspond to noise and the additional data samples with consistent features may be retrieved and added to the impure subcluster to reenforce it. In this situation, the data samples from the impure subcluster and the additional data samples identified may be re-stored as data to be clustered 290 for the next iteration. If a search based on the representative features of the impure subcluster does not yield additional data samples, then the data samples in the impure subcluster may be deemed as noise and may be removed from further processing. This may be achieved by removing such data samples from the data to be clustered 290 so that they are no longer considered in the next iteration.

As discussed herein, data samples to be clustered may include different types such as textual, numeric, or categorical. The representative features computed for identifying additional data samples may depend on the type of data to be clustered. For example, features such as words and topics associated with textual data may be representative because textual information generally may be used for conveying semantics. In this case, to search for additional data samples consistent with a given impure subcluster with text data, nouns, verbs, entities, and other text relevant features may be used as representative features. On the other hand, if the underlying data corresponds to numeric data, representative features for searching similar data samples may be different. In some embodiments, numeric value ranges and value distribution across different dimensions may be representative.

FIGS. 4A-4C provide an example of numeric data, the representative features used for searching additional data samples, and searched additional and consistent data samples. FIG. 4A shows a numeric data sample 440 with features in different dimensions corresponding to "Late_Charge" (410), "Prev_Bill" (420), and "Current_Bill" (430). In this example, the "Late-Charge" field 410 records an amount charged under the category of late charges. The "Prev_Bill" field 420 records the charge made in a previous cycle and the "Current_Bill" field 430 records the amount associated with the charge for the current billing cycle. The given data sample 440 shows that the numeric values across the three fields have some relationships. For instance, the previous charge is higher than the current charge and the late charge is lower than both the previous and current charges. Given that, the representative features for such numeric data may differ from words/phrases/entities that are used for textual data. In this example, what may be important is the value distribution across different fields so that additional data samples consistent with data sample 440 may be searched and ones with similar value variation patterns (representative features) may be identified. FIG. 4B shows a set of data 450 record archive 280 which may be searched using representative features of the data sample 440. FIG. 4C shows three additional data samples 460 searched from 450 that have features consistent with what is detected in data sample 440 as shown in FIG. 4A.

Figure 4D:
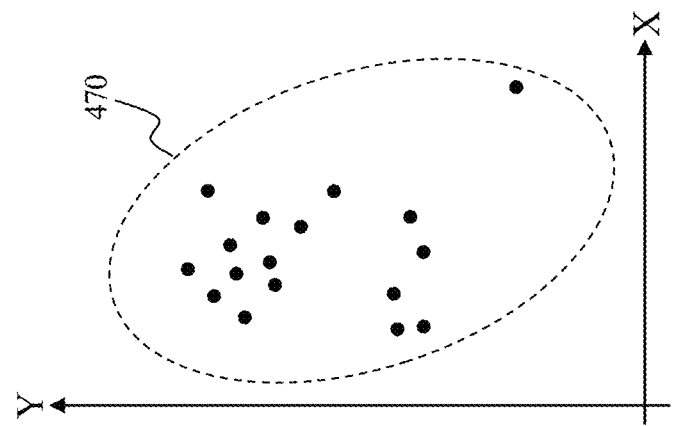
FIGS. 4D-4F show example denoising situations that can be automatically detected and processed to generate denoised clusters, in accordance with an embodiment of the present teaching.
Figure 4E:
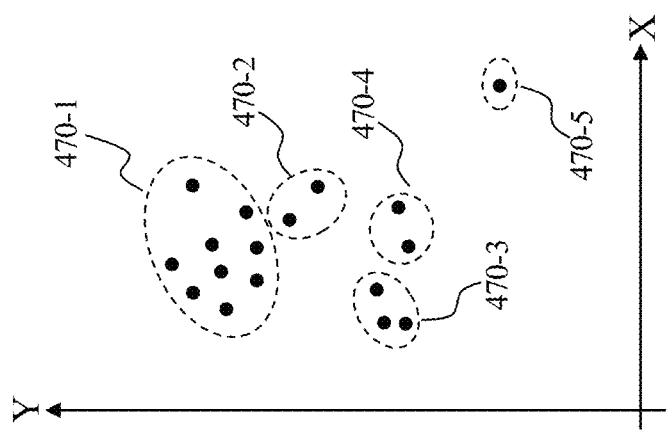
Figure 4F:
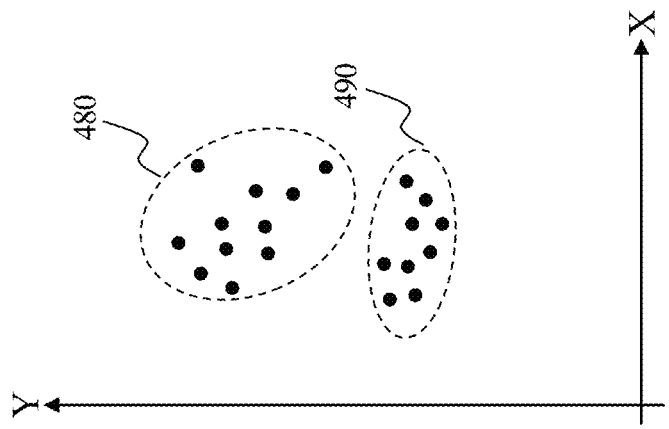

FIGS. 4D-4F show different stages in denoising to derive denoised clusters, in accordance with an embodiment of the present teaching. FIG. 4D shows an initial cluster 470 obtained via conventional clustering. FIG. 4E shows an exemplary multiple subclusters 470-1-470-5 obtained via hierarchical clustering on the initial cluster 470. As can be seen, some subclusters are bigger than others. For instance, subcluster 470-1 includes 9 data samples; subcluster 470-3 includes 3 data samples; subclusters 470-2 and 470-4 include two data samples; and subcluster 470-5 includes only one data sample. Each of the subclusters is processed further to examine whether it is to be merged with a pure subcluster, whether it is to be removed as a noise, or whether additional consistent data samples with consistent features are to be retrieved to bootstrap the subcluster.

By processing of each of the subclusters in the example shown in FIG. 4E, FIG. 4F shows the denoising result, which includes two denoised subclusters 480 and 490, obtained based on the subclusters 470-1-470-5. In this illustration, the example condition for detecting an impure subcluster is based on the size, e.g., a subcluster has fewer than 5 data samples. Based on this condition, subclusters 470-2-470-5 may be identified as impure subclusters. Each of these impure subclusters may be further analyzed. For instance, by comparing with sub-cluster 470-1 during the active learning, subcluster 470-2 may be considered similar to subcluster 470-1 so that it is merged with 470-1 to generate a modified subcluster 480 as shown in FIG. 4F. In addition, for impure subcluster 470-5, as no additional data samples with consistent features may be retrieved from data record archive 280, it is deemed as noise and is removed. Furthermore, based on the representative features computed from impure subclusters 470-3 and 470-4, additional data samples with consistent features may be identified from the data record archive 280 and added as part of the data to be clustered 290 so that in the next iteration, the data samples in the impure subclusters 470-3 and 470-4 together with the additional data samples bootstrapped may lead to a cluster 490 as shown in FIG. 4F. As seen, the present teaching discloses an approach to systematically and automatically detecting impure subclusters and then processing each to either reduce noise or reinforce the data to lead to improved clustering result with denoised clusters.

Figure 5:
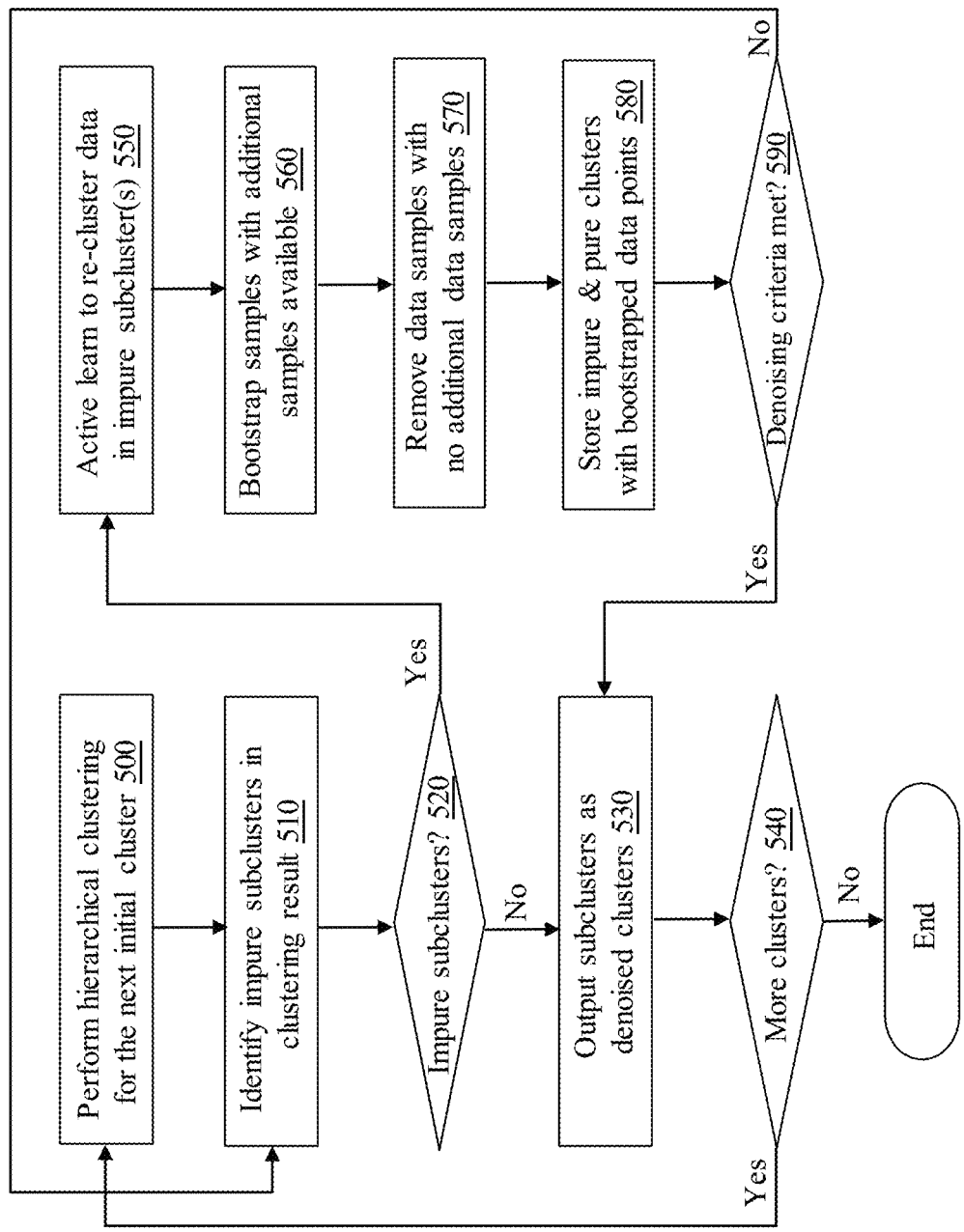
FIG. 5 is a flowchart of an exemplary process of a cluster denoising engine, in accordance with an embodiment of the present teaching.

FIG. 5 is a flowchart of an exemplary process of the cluster denoising engine 250, in accordance with an embodiment of the present teaching. In operation, the cluster denoising controller 300 invokes the hierarchical clustering unit 310 to perform, with respect to each of the initial clusters 240, hierarchical clustering at 500 to obtain multiple cluster-specific subclusters 320. The impure subcluster identifier 330 is then invoked to identify, at 510, impure subclusters from the subclusters 320. As discussed herein, some criterion may be specified to detect an impure subcluster. For example, the criterion may define that any subcluster having a size smaller than a certain level is considered as an impure subcluster. If no impure subcluster is identified, determined at 520, the subclusters 320 are output, at 530, as denoised clusters 230. When there are more initial clusters to be processed, determined at 540, the processing returns to step 500 to process the next initial cluster. Otherwise, the denoising process ends.

When impure subcluster(s) is detected, each of the data samples in the impure subclusters is denoised according to a specific situation associated with each. The active-learning engine 340 may conduct active learning at 550 to determine which data samples in the impure subcluster(s) may be merged with corresponding pure subcluster and move such selected data samples from impure subcluster(s) to the identified corresponding pure subcluster(s). This denoises some data samples initially in some impure subclusters and creates modified pure subclusters. With the remaining data samples in impure subcluster(s), the impure subcluster data bootstrapper 360 is activated to try to bootstrap, at 560, each data sample in an impure subcluster by searching for additional data samples from the data record archive 280 that has similar features as that of the data sample in the impure subcluster. If no additional data sample is available, the impure subcluster data bootstrapper 360 removes the data sample from the impure subcluster at 570. If additional data samples are found, the additional data samples may then be added to the impure subcluster to form a modified impure subcluster. The pure subclusters (which may be modified to be merged with some additional data samples from impure subclusters) and the impure subclusters (which may include those appended with additional data samples) may be stored, at 480, as the data to be clustered 290 for the next iteration.

Figure 6:
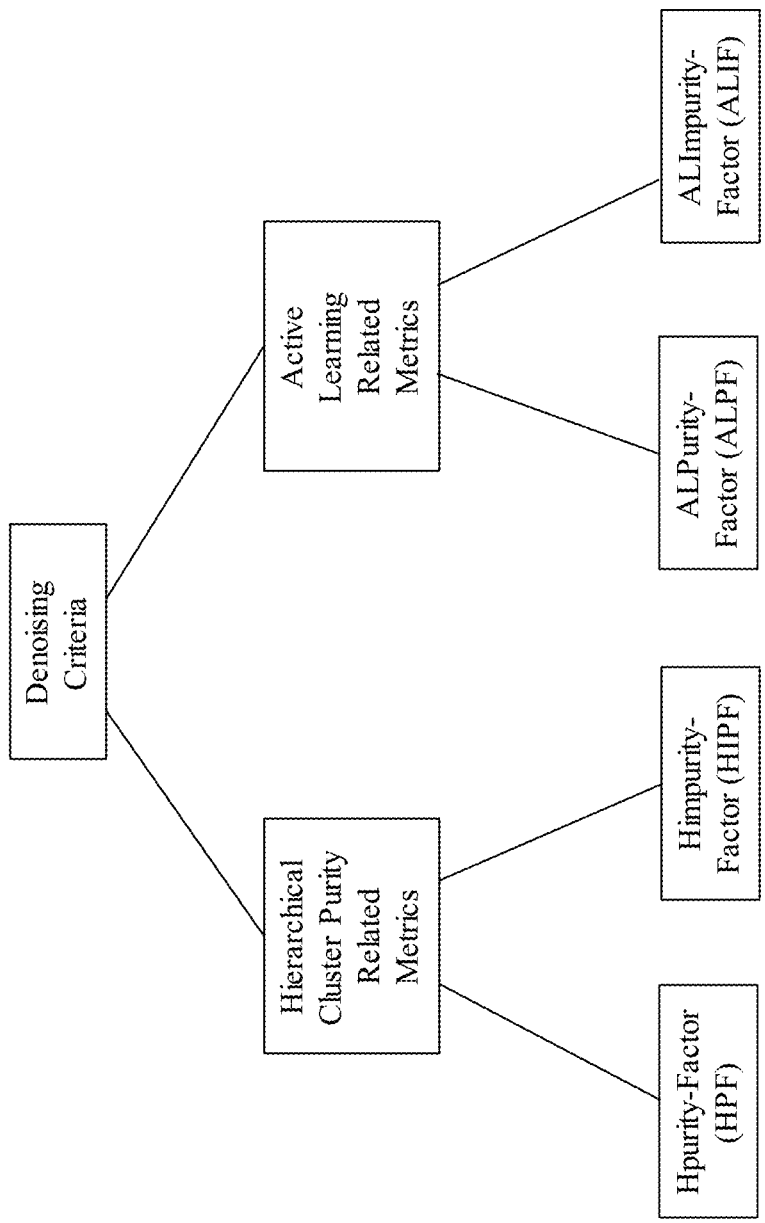
FIG. 6 shows exemplary factors used in denoising criteria for controlling convergence in iterative denoising clustering, in accordance with an embodiment of the present teaching.

To determine whether the next iteration is needed, the cluster denoising controller 300 accesses the denoising criteria 270 and determines, at 590, whether the current subclusters (including pure and impure subclusters) satisfy the denoising criteria 270. FIG. 6 provides exemplary metrics based on which the denoising criteria 270 may be formulated. If the current subclusters satisfy the denoising criteria 270, the subclusters are output, at 530, as denoised clusters. Otherwise, the next iteration may be initiated by returning to step 510. In this case, the current subclusters, including the pure subclusters from the last iteration and the modified impure subclusters, may be evaluated to detect impure subclusters. Some of the modified impure subclusters may now be classified as pure subclusters because of the appended additional data samples. The process continues until all subclusters associated with the initial clusters 240 become pure subclusters.

FIG. 6 shows exemplary factors used in denoising criteria 270 used for controlling the iterative denoising process, in accordance with an embodiment of the present teaching. In some embodiments, the denoising criteria 270 may be specified based on metrics obtained at different phases of the denoising operation, including, e.g., metrics obtained based on hierarchical clustering result and metrics obtained based on active learning results. For example, based on the hierarchical clustering result, impure subclusters are identified and metrics may be computed to measure, e.g., the rate of impurity of the hierarchical result. In some embodiments, a metric related to hierarchical clustering purity factor (hereinafter referred to as HPF) may be determined based on, e.g., the ratio of the number of data samples included in pure subclusters to the total number of data samples clustered. Another metric on hierarchical clustering impurity factor (hereinafter referred to as HIPF) may be determined as, e.g., the ratio of the number of noisy data samples in impure subclusters to the total number of data samples clustered.

The metrics obtained based on active learning results may include active learning purity factor (hereinafter referred to as ALPF) which may be determined based on, e.g., the ratio of the total number of data samples not subject to correction to the total number of data samples clustered, where the correction may include situations such as noise removal and re-clustering in the current iteration. Another active learning phase related metric may be an active learning impurity factor (hereinafter referred to as ALIF) which may represent a level of impurity in the cluster and may be determined based on, e.g., the ratio of the number of data samples being corrected to the total number of data samples clustered. As these exemplary metrics HPF, HIPF, ALPF, and ALIF are computed based on the denoising operation performed in the current iteration, they may be used to assess the quality of the clustering of the current iteration with respect to the noise. Accordingly, the denoising criteria 270 may be defined based on a quality level needed by an application. For instance, HPF may be required to be higher than a first level T1; HIPF be lower than a second level T2; ALPF be higher than a third level T3; and ALIF be lower than a fourth level T4. In some embodiments, the denoising criteria 270 may then be defined based on any of these conditions or any combination thereof. As illustrated in FIG. 4, when the denoising criteria 270 are satisfied, the denoising operation terminates. If not, the next iteration starts again. By adjusting the denoising criteria 270 defined based on the metrics according to the need of an application, the denoising operation may be controlled in a way to produce denoised or pure clusters that the application considers as acceptable.

Via the iterative denoising process as discussed herein, the clusters 260 have significantly reduced noise based on the denoising criteria 270. Clustering is a frequently used tool in data analytics for processing unlabeled input data to generate grouping of data, e.g., clusters, in a way that data in each cluster shares common characteristics, while data in different clusters have distinct differences in some of the properties from data in other clusters. Such clusters and their shared and distinct characteristics are often utilized in different applications. For instance, users may be grouped into different user segments based on their demographics and other properties. Network elements on a, e.g., radio access network (RAN), may be clustered based on their tracked key performance indicators (KPIs), network characteristics, network traffic data, configuration data, network element physical and non-physical characteristics, and or the like. Content may be grouped into different clusters each of which corresponds to some distinct topics. Interactions between customers and service providers may be clustered into different categories, each of which may be related to a particularly type of service issues and solutions thereof. Data representing user behaviors may be clustered into different groups each of which may represent a certain type of intent, which may be explored to determine, e.g., the content/product/service to be offered or recommended to the user. User activities directed to certain content/advertisements may also be clustered into different groups corresponding to diverse interests which may be exploited in different applications to personalize product/service/content/advertisement recommended to users of different interests.

Figure 7:
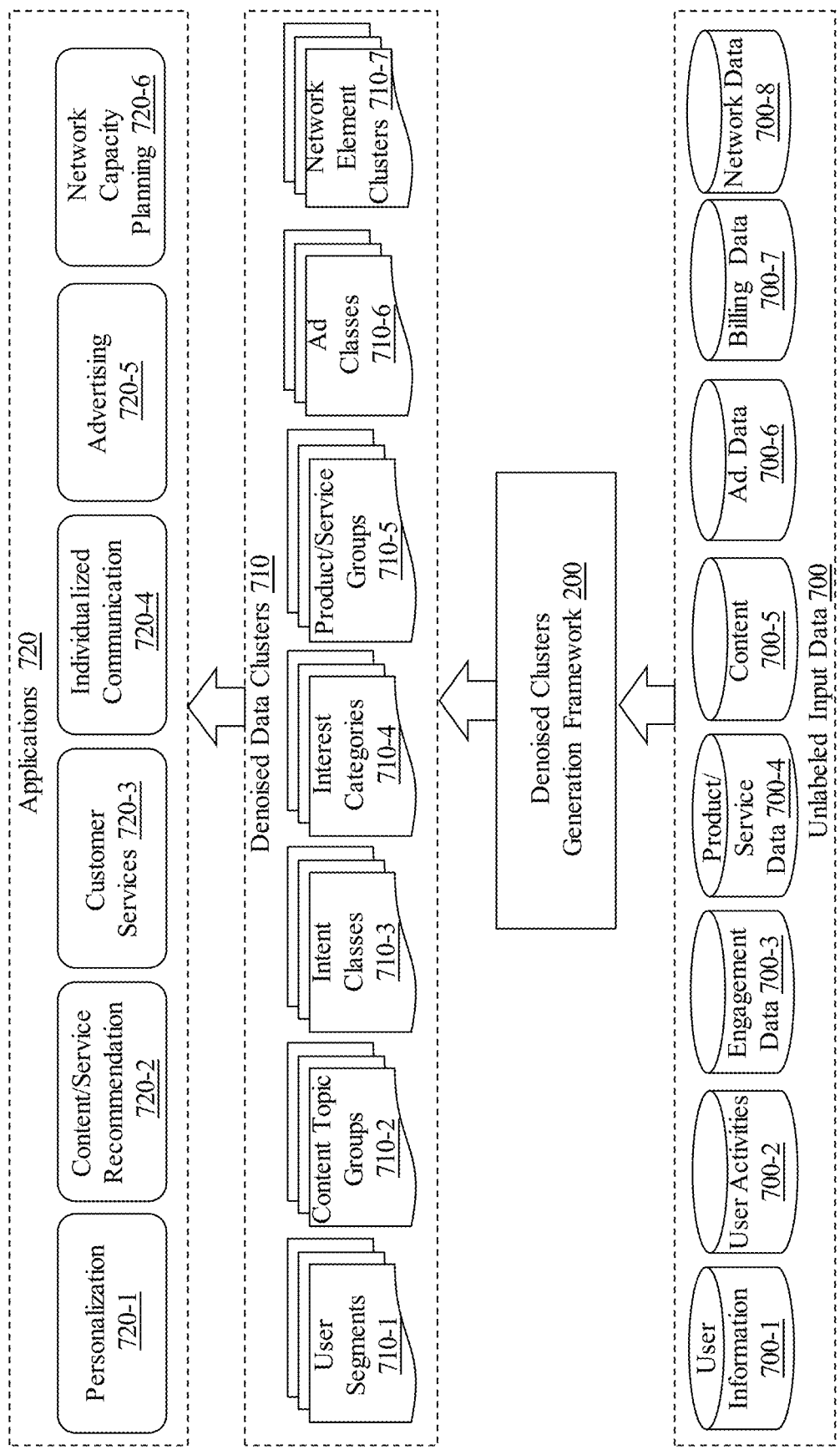
FIG. 7 shows exemplary applications of denoised clusters obtained from unlabeled input data in accordance with an embodiment of the present teaching.

The diversity of applications that may rely on clusters of unlabeled input data as well as the characteristics thereof is illustrated in FIG. 7, in accordance with an embodiment of the present teaching. As shown, unlabeled input data 700 of different types may be collected from multiple sources. Such unlabeled input data 700 collected may include, but is not limited to, user information 700-1, user activities 700-2 (e.g., search histories, clicks, conversions, etc.), engagement data 700-3 (e.g., communication length, frequency, dwell time on certain content, etc.), product/service data 700-4, content 700-5, advertisement data 700-6, billing data 700-7, and network data 700-8 such as KPIs with respect to different network elements. Such unlabeled input data may be utilized by different applications 720, which include, but is not limited to, personalization 720-1, content/service recommendation 720-2 (where content may include articles, publications, advertisement, visual/audio information, etc.), customer services 720-3, individualized communications 720-4, advertising 720-5, and network capacity planning 720-6.

To enable the applications 720 to leverage the input data 700 collected, the unlabeled input data 700 may be clustered so that data in the same group possesses common characteristics while data from different clusters have distinct characteristics. As shown in FIG. 7, the unlabeled input data 700 as illustrated may be used for clustering by the framework 200 (see FIG. 2A) to generated denoised data clusters 710, which may include user segments 710-1, content topic groups 710-2, intent classes 710-3, interest categories 710-4, product/service groups 710-5, ad classes 710-6, and network element clusters 710-7. For instance, RAN network elements may be grouped to generate network element clusters 710-7 according to, e.g., their performances. These network element clusters 710-7 may be identified so as to perform various actions on specific sets of clusters to, for example, improve network performance by modifying configurations and/or physical and non-physical characteristics of the network element, to troubleshoot network issues, to perform future network capacity planning by correlating with user clusters and segments, and or the like. Different denoised clusters of different types may be derived using relevant unlabeled input data in accordance with the present teaching as disclosed herein. By grouping the input data into different clusters, relationships between the data such as correlation may be identified and used by various applications. For example, clusters in the product/service groups 710-5 may be correlated with corresponding clusters in the interest categories 710-4 so that an application, e.g., product/service recommendation 720-2, may recommend certain services to users with certain known interests. As another example, relationships between user segments 710-1 and content topic groups 710-2 may be exploited so that an application, e.g., individualized communication 720-4 may leverage the known relationship to conduct a communication with a user in a known user segment in a topic known to be interested by users of that segment. Yet another example is related to network capacity planning application 720-6, which may identify correlations between user segments 710-1 and network element clusters 710-7 to facilitate planning of network capacity for different user segments.

The effectiveness of an application to leverage the input data depends on the quality of the clusters derived. The denoised clusters that may be obtained by the framework 200 according to the present teaching enhance the quality of clustering result by recognizing and removing noise from clusters so that the data within the same cluster achieves a higher degree of cohesion and data from different clusters present a higher degree of distinction. Such denoised clusters facilitate improved identification of relationships in data and, thus, may enhance the applications that rely on such data relationships to make various decisions.

Figure 8:
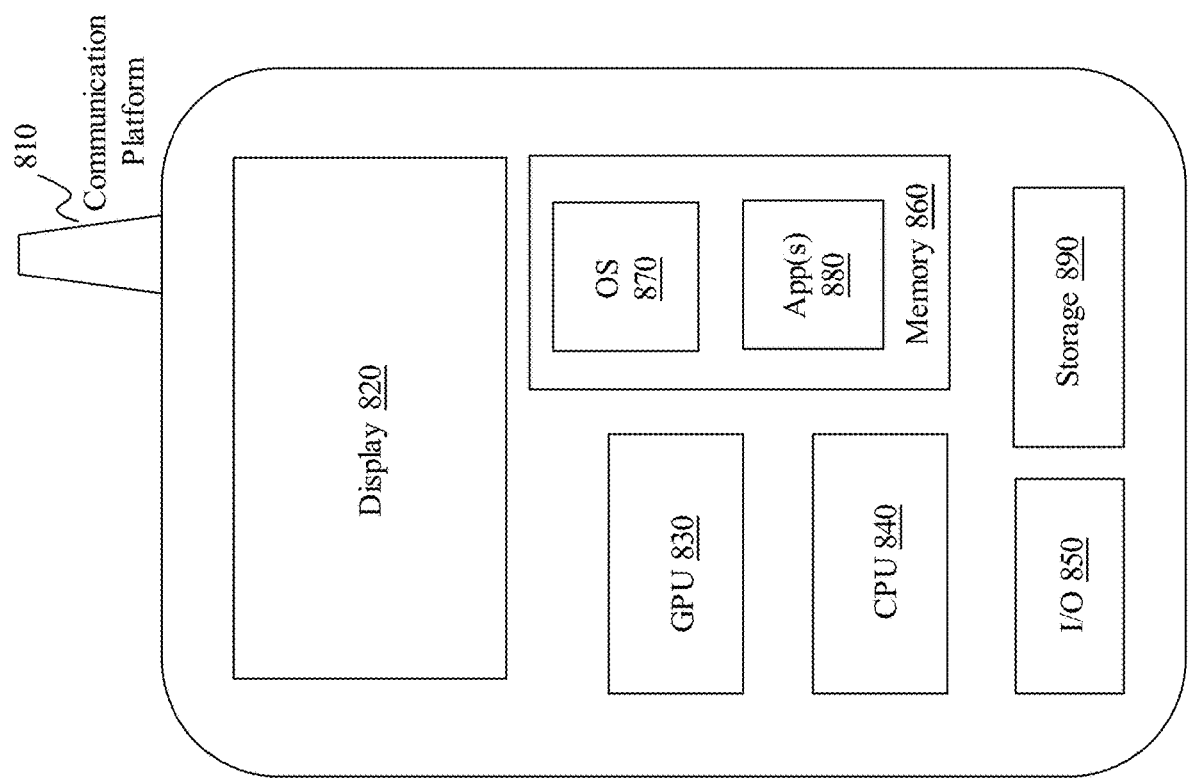
FIG. 8 is an illustrative diagram of an exemplary mobile device architecture that may be used to realize a specialized system implementing the present teaching in accordance with various embodiments.

FIG. 8 is an illustrative diagram of an exemplary mobile device architecture that may be used to realize a specialized system implementing the present teaching in accordance with various embodiments. In this example, the user device on which the present teaching may be implemented corresponds to a mobile device 800, including, but not limited to, a smart phone, a tablet, a music player, a handled gaming console, a global positioning system (GPS) receiver, and a wearable computing device, or a mobile computational unit in any other form factor. Mobile device 800 may include one or more central processing units ("CPUs") 840, one or more graphic processing units ("GPUs") 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870 (e.g., iOS, Android, Windows Phone, etc.) and one or more applications 880 may be loaded into memory 860 from storage 890 in order to be executed by the CPU 840. The applications 880 may include a user interface or any other suitable mobile apps for information exchange, analytics, and management according to the present teaching on, at least partially, the mobile device 800. User interactions, if any, may be achieved via the I/O devices 850 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 9:
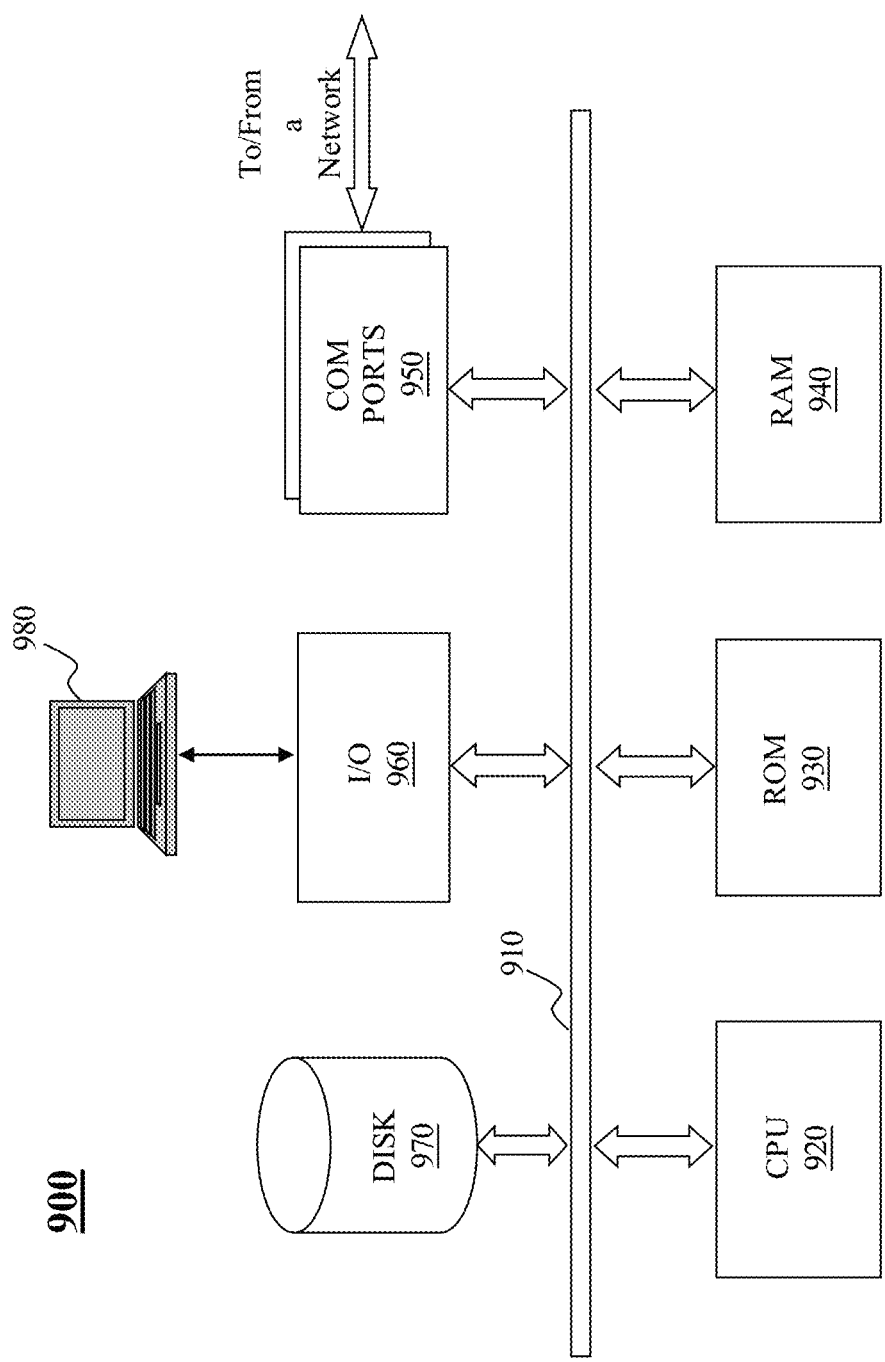
FIG. 9 is an illustrative diagram of an exemplary computing device architecture that may be used to realize a specialized system implementing the present teaching in accordance with various embodiments.

FIG. 9 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 900 may be used to implement any component or aspect of the framework as disclosed herein. For example, the information processing and analytical method and system as disclosed herein may be implemented on a computer such as computer 900, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 900, for example, includes COM ports 950 connected to and from a network connected thereto to facilitate data communications. Computer 900 also includes a central processing unit (CPU) 920, in the form of one or more processors, for executing program instructions. The exemplary computer platform includes an internal communication bus 910, program storage and data storage of different forms (e.g., disk 970, read only memory (ROM) 930, or random-access memory (RAM) 940), for various data files to be processed and/or communicated by computer 900, as well as possibly program instructions to be executed by CPU 920. Computer 900 also includes an I/O component 960, supporting input/output flows between the computer and other components therein such as user interface elements 980. Computer 900 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method for network capacity planning, comprising:

clustering a plurality of data samples to obtain initial clusters, wherein the plurality of data samples includes attributes of one or more network elements in a radio access network and their respective key performance indicators;

hierarchically clustering each of the initial clusters to obtain one or more subclusters associated therewith;

classifying each of the one or more subclusters in each of the initial clusters into one of a pure and an impure subcluster according to a first criterion;

outputting the one or more subclusters that have no impure subcluster present as denoised clusters;

with respect to at least one impure subcluster, denoising the at least one impure subcluster by performing at least one of:

merging a first data sample in some of the at least one impure subcluster with a corresponding pure subcluster to generate a modified pure subcluster, bootstrapping a second data sample in some of the at least one impure subcluster with additional data samples having properties consistent with data samples in the impure subcluster to generate a modified impure subcluster, and removing a third data sample in some of the at least one impure subcluster, where no additional data sample similar to the third data sample is available;

iterating the steps of classifying, outputting, and denoising until a denoising criterion is satisfied to obtain denoised clusters corresponding to clusters of network elements; and performing actions on the network elements according to their corresponding denoised clusters of the denoised clusters.

2. The method of claim 1, wherein the classifying comprises:

determining a metric specified in the first criterion; and with respect to each of the one or more subclusters,
computing the metric based on the subcluster,
if the metric satisfies the first criterion, labeling the subcluster as a pure subcluster, and
if the metric does not satisfy the first criterion, labeling the subcluster as an impure subcluster.

3. The method of claim 2, wherein the metric is defined as a size of a subcluster corresponding to a number of data samples included in the subcluster.

4. The method of claim 1, wherein the merging comprises:

performing active learning to select the first data sample from an impure subcluster and a corresponding pure subcluster; and moving the first data sample from the impure subcluster to the corresponding pure subcluster to create the modified pure subcluster.

5. The method of claim 1, wherein the bootstrapping comprises:

computing representative features of the second data sample;

searching, from a data record archive, for the additional data samples based on the representative features of the second data sample, wherein each of the additional data samples has corresponding representative features that are consistent with the representative features of the second data sample; and adding the additional data samples to the impure subcluster of the second data sample to create the modified impure subcluster.

6. The method of claim 1, wherein the removing comprises:

computing representative features of the third data sample;

searching a data record archive for additional data samples based on the representative features of the third data sample; and when the search yields no additional data sample, deleting the third data sample from the impure subcluster.

7. The method of claim 1, wherein the denoising criterion is defined based on one or more of:

a hierarchical cluster purity metric including at least one of
a hierarchical purity factor, and
a hierarchical impurity factor; and an active learning related metric including at least one of
an active learning purity factor, and
an active learning impurity factor.

8. A non-transitory machine readable storage medium having information recorded thereon, wherein the information, when read by the machine, causes the machine to perform the following steps:

clustering a plurality of data samples to obtain initial clusters, wherein the plurality of data samples includes attributes of one or more network elements in a radio access network and their respective key performance indicators;

hierarchically clustering each of the initial clusters to obtain one or more subclusters associated therewith;

classifying each of the one or more subclusters in each of the initial cluster into one of a pure and an impure subcluster according to a first criterion;

outputting the one or more subclusters that have no impure subcluster present as denoised clusters;

with respect to at least one impure subcluster, denoising the at least one impure subcluster by performing at least one of:

merging a first data sample in some of the at least one impure subcluster with a corresponding pure subcluster to generate a modified pure subcluster, bootstrapping a second data sample in some of the at least one impure subcluster with additional data samples having properties consistent with data samples in each impure subcluster to generate a modified impure subcluster, and removing a third data sample in some of the at least one impure subcluster, where no additional data sample similar to the third data sample is available;

iterating the steps of classifying, outputting, and denoising until a denoising criterion is satisfied to obtain denoised clusters corresponding to clusters of network elements; and performing actions on the network elements according to their corresponding denoised clusters of the denoised clusters.

9. The medium of claim 8, wherein the classifying comprises:

determining a metric specified in the first criterion; and with respect to each of the one or more subclusters,
computing the metric based on the subcluster,
if the metric satisfies the first criterion, labeling the subcluster as a pure subcluster, and
if the metric does not satisfy the first criterion, labeling the subcluster as an impure subcluster.

10. The medium of claim 9, wherein the metric is defined as a size of a subcluster corresponding to a number of data samples included in the subcluster.

11. The medium of claim 8, wherein the merging comprises:

performing active learning to select the first data sample from an impure subcluster and a corresponding pure subcluster; and moving the first data sample from the impure subcluster to the corresponding pure subcluster to create the modified pure subcluster.

12. The medium of claim 8, wherein the bootstrapping comprises:

computing representative features of the second data sample;

searching, from a data record archive, for the additional data samples based on the representative features of the second data sample, wherein each of the additional data samples has corresponding representative features that are consistent with the representative features of the second data sample; and adding the additional data samples to the impure subcluster of the second data sample to create the modified impure subcluster.

13. The medium of claim 8, wherein the removing comprises:

computing representative features of the third data sample;

searching, from a data record archive, for additional data samples based on the representative features of the third data sample; and when the search yields no additional data sample, deleting the third data sample from the impure subcluster.

14. The medium of claim 8, wherein the denoising criterion is defined based on one or more of:
a hierarchical cluster purity metric including at least one of
a hierarchical purity factor, and
a hierarchical impurity factor; and
an active learning related metric including at least one of
an active learning purity factor, and
an active learning impurity factor.

15. A system for network capacity planning, comprising:
a clustering engine implemented by a processor and configured for clustering a plurality of data samples to obtain initial clusters, wherein the plurality of data samples includes attributes of one or more network elements in a radio access network and their respective key performance indicators;
a hierarchical clustering unit implemented by a processor and configured for hierarchically clustering each of the initial clusters to obtain one or more subclusters associated therewith;
an impure subcluster identifier implemented by a processor and configured for
classifying each of the one or more subclusters in each of the initial clusters into one of a pure and an impure subcluster according to a first criterion, and
outputting the one or more subclusters that have no impure subcluster present as denoised clusters;
a cluster denoising engine implemented by a processor and configured for, with respect to at least one impure subcluster, denoising the at least one impure subcluster by performing at least one of:
merging a first data sample in some of the at least one impure subcluster with a corresponding pure subcluster to generate a modified pure subcluster,
bootstrapping a second data sample in some of the at least one impure subcluster with additional data samples having properties consistent with data samples in each impure subcluster to generate a modified impure subcluster, and
removing a third data sample in some of the at least one impure subcluster, where no additional data sample similar to the third data sample is available, wherein
the steps of classifying, outputting, and denoising are iterated until a denoising criterion is satisfied to obtain denoised clusters corresponding to clusters of network elements; and performing actions on the network elements according to their corresponding denoised clusters of the denoised clusters.

16. The system of claim 15, wherein the classifying comprises:
determining a metric specified in the first criterion; and
with respect to each of the one or more subclusters,
computing the metric based on the subcluster,
if the metric satisfies the first criterion, labeling the subcluster as a pure subcluster, and
if the metric does not satisfy the first criterion, labeling the subcluster as an impure subcluster, wherein
the metric is defined as a size of a subcluster corresponding to a number of data samples included in the subcluster.

17. The system of claim 15, wherein the merging comprises:
performing active learning to select the first data sample from an impure subcluster and a corresponding pure subcluster; and
moving the first data sample from the impure subcluster to the corresponding pure subcluster to create the modified pure subcluster.

18. The system of claim 15, wherein the bootstrapping comprises:
computing representative features of the second data sample;
searching, from a data record archive, for the additional data samples based on the representative features of the second data sample, wherein each of the additional data samples has corresponding representative features that are consistent with the representative features of the second data sample; and
adding the additional data samples to the impure subcluster of the second data sample to create the modified impure subcluster.

19. The system of claim 15, wherein the removing comprises:
computing representative features of the third data sample;
searching, from a data record archive, for additional data samples based on the representative features of the third data sample; and
when the search yields no additional data sample, deleting the third data sample from the impure subcluster.

20. The system of claim 15, wherein the denoising criterion is defined based on one or more of
a hierarchical cluster purity metric including at least one of
a hierarchical purity factor, and
a hierarchical impurity factor; and
an active learning related metric including at least one of
an active learning purity factor, and
an active learning impurity factor.

* * * * *